United States Patent [19]

Schubart

[11] 4,043,724

[45] Aug. 23, 1977

[54] DEVICE FOR PRESSING ARTICLES SUCH AS PLATES FROM PULVERULENT PORCELAIN COMPOSITION

[75] Inventor: Rolf Egon Romnald Schubart, Kochel, Germany

[73] Assignee: Dorst-Keramikaschinen-Bau Otto Dorst U. Dipl. -Ing. Walter Schlegel, Kochel, Germany

[21] Appl. No.: 595,235

[22] Filed: July 11, 1975

[51] Int. Cl.$^2$ .......... B29C 3/00

[52] U.S. Cl. .......... 425/218; 425/361; 425/412

[58] Field of Search .......... 425/389, 405, 412, 256, 425/261, 348 R, 344, 357, 361, 218

[56] References Cited

U.S. PATENT DOCUMENTS

| | | | |
|---|---|---|---|
| 2,382,004 | 8/1945 | Curran | 425/398X |
| 2,449,008 | 9/1948 | Pecker et al. | 425/344 X |
| 2,575,734 | 11/1951 | Schulman | 425/405 |
| 3,256,375 | 6/1966 | Bolelli et al. | 425/398 X |
| 3,284,858 | 11/1966 | Taccone | 425/405 X |
| 3,431,598 | 3/1969 | Lueddeke et al. | 425/348 X |
| 3,737,276 | 6/1973 | Hill et al. | 425/398 X |

FOREIGN PATENT DOCUMENTS

| | | | |
|---|---|---|---|
| 379,391 | 8/1923 | Germany | 425/405 |

*Primary Examiner*—Robert L. Spicer, Jr.
*Attorney, Agent, or Firm*—Price, Heneveld, Huizenga & Cooper

[57] ABSTRACT

A device is disclosed for forming blanks from pulverulent porcelain material which blanks have a foot piece and sloping sides. The device has an upper mould which acts against a lower mould, the upper face of which lower mould is formed by a distendable, elastic membrane closing the upper end of a liquid filled chamber. Within the chamber, a central member provides resilient support for the center of the membrane. The parts are so arranged that upon closing of the mould portions a layer of pulverulent porcelain composition is gradually shaped and compressed between the upper mould and the membrane into a concave article blank including a foot piece, and where necessary a relief design, which blank is of uniform thickness and density.

17 Claims, 3 Drawing Figures

DEVICE FOR PRESSING ARTICLES SUCH AS PLATES FROM PULVERULENT PORCELAIN COMPOSITION

SUMMARY OF THE INVENTION

The invention relates to a press with a pressing punch adapted to be moved against a lower mould filled with pulverulent porcelain composition, for the pressing of blanks of articles such as plates.

In accordance with the prior art, plates were pressed by rolling a disc-like, leather-hard prepressing out of a suitably conditioned porcelain composition over a mould. This method requires a substantial amount of time even for preparation of the disc-like, leather-hard prepressing and the method is comparatively complicated and, therefore, expensive.

The production of plates by pressing of a pulverulent starting composition has until now not been attempted, although the pressing of porcelain or ceramic bodies of pulverulent compositions has come to be accepted in many different fields, for example in the case of the production of tiles, parts for electrical engineering or the like.

The main reason for this was the problem that, in the case of pressing plates of pulverulent porcelain composition, the height of filling of the material to be pressed must be so selected that the finished plate has its plate foot, a more or less oblique plate edge and possibly relief decoration all pressed evenly, and the height of filling at the individual parts of the plate must amount in each case approximately to twice the wall thickness or the foot height respectively of the plate. However, even though the pulverulent porcelain composition initially was properly distributed over the whole lower mould, uniformity of material thickness was not assured. This is due to the fact that the pulverulent material to be pressed has a comparatively gentle angle of repose and repeatedly runs or slumps down into the lower part of the pressing mould.

One aim of the invention, therefore, is that of providing a device on which the plate can be pressed from pulverulent porcelain composition, that is to say, by which the previously discussed problem of uniform distribution of the composition within the mould is solved.

A press for the pressing of articles incorporating the invention has a rigid upper pressing punch shaped in accordance with the inner side or face of the article to be produced and a space beneath the upper pressing punch which space is closed by an elastic membrane held in place by a filling web and shaped on its edge in accordance with the peripheral shape and dimensions of the article to be produced characterized in that the membrane is provided with an annular groove corresponding to the foot of the plate and having a height of filling amounting approximately to twice the foot height of the article to be produced and wherein the space closed by the membrane is filled with a pressure medium which can be pressurized after the pressing punch is lowered to the pressing position and onto the pulverulent porcelain composition spread on the membrane within the limits permitted by the filling web.

In the case of the invention the principle of isostatic pressing is used, which has already been found successful in the case of the pressing of radially symmetrical bodies such as insulators and the like. However, in the case of this invention this principle is so modified that it can be used for the mass production of plates or the like, using pulverulent porcelain composition.

In accordance with a further modification of the invention an annular support body is provided in the pressure medium space with the dimensions and the shape of the lower side of the plate edge as a terminal abutment for the membrane sinking under the pressure of the pressing punch.

In accordance with a further embodiment of the invention, in the pressure medium space adjacent to the annular groove on the membrane a support plate is arranged which holds this part of the membrane flat and can be retracted against spring force.

The membrane preferably has, at the edge, an annular extension, reaching between the wall of the pressure medium space and the support body, with a reversed lip seal, by means of which it is anchored in the pressure medium space.

The pressure medium space is preferably constructed within a single block, on which a spindle is centrally journalled in a rotary manner. On the spindle an anchoring cross is screwed so as to be held without the possibility of twisting in relation to the block. The cross at its cross arm ends carries tension anchors which are mounted for displacement in the block and anchored in the support body. In this manner the whole arrangement can be assembled comparatively simply and can be disassembled for any repairs which may be necessary.

In accordance with a further embodiment of the invention, the reverse lip seal is held advantageously between the edge of the support body and a bearing ring accommodated in the block and the ring can be moved upwards via lifting rods in the block.

In this manner the membrane can easily be removed if, for example, after the pressing of several thousand and in some cases ten thousand plates it must be replaced.

The placing of the pulverulent porcelain composition on the membrane, which in the initial stage is substantially flat, with the exception of the annular groove, is carried out in accordance with the invention preferably by a filling funnel which can be moved into the space between the lower mould and the pressing punch. The funnel preferably can be swung into position to place the material for pressing centrally on the membrane. The funnel is surrounded by a plate-shaped distributor which can be rotated for distributing the material for pressing evenly on the membrane.

The principle of the invention is now to be described with reference to the accompanying drawings in more detail.

FIG. 1 shows a partial longitudinal section through a press for the pressing of plates or the like.

Figure 1:
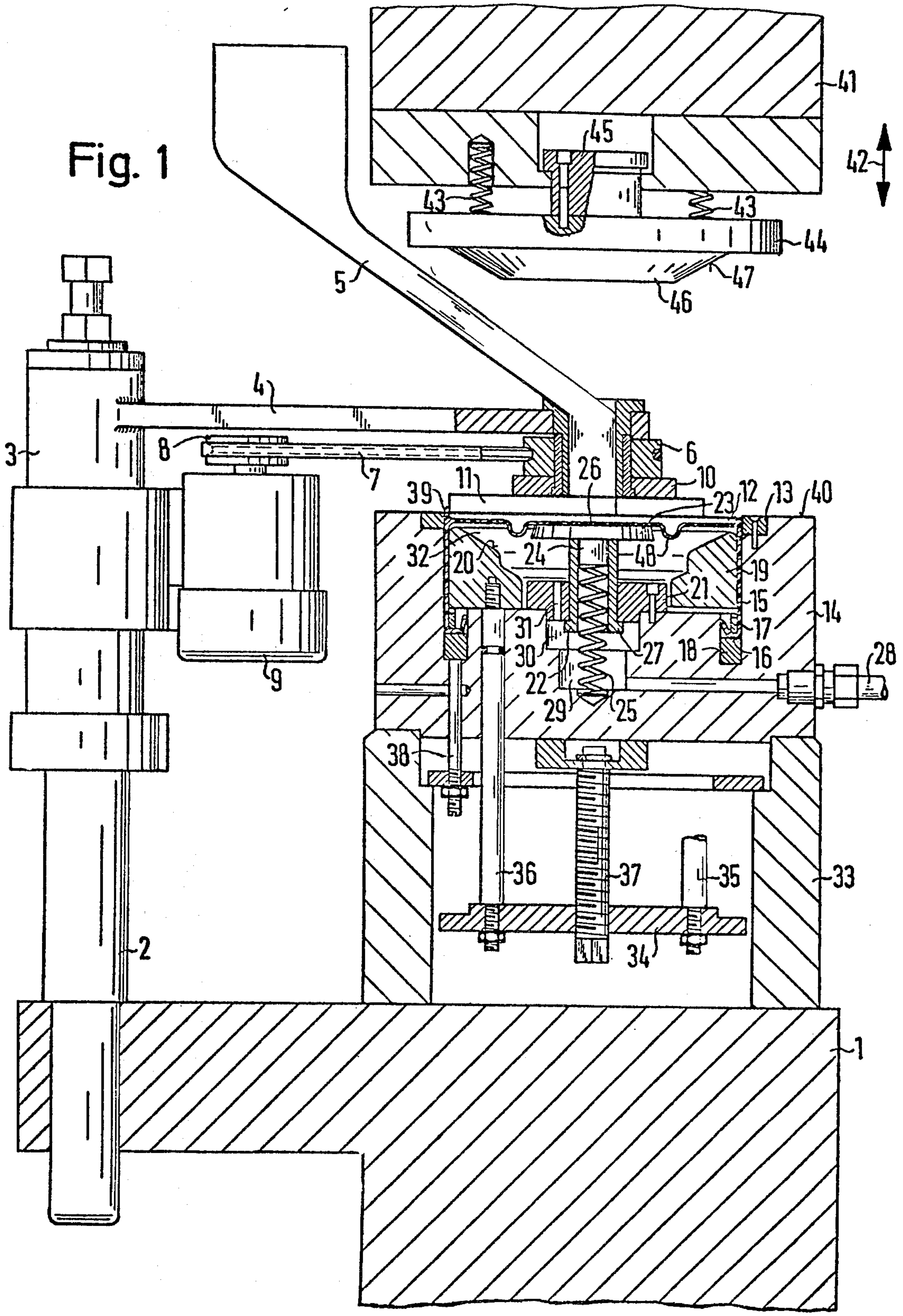
Figure 2:
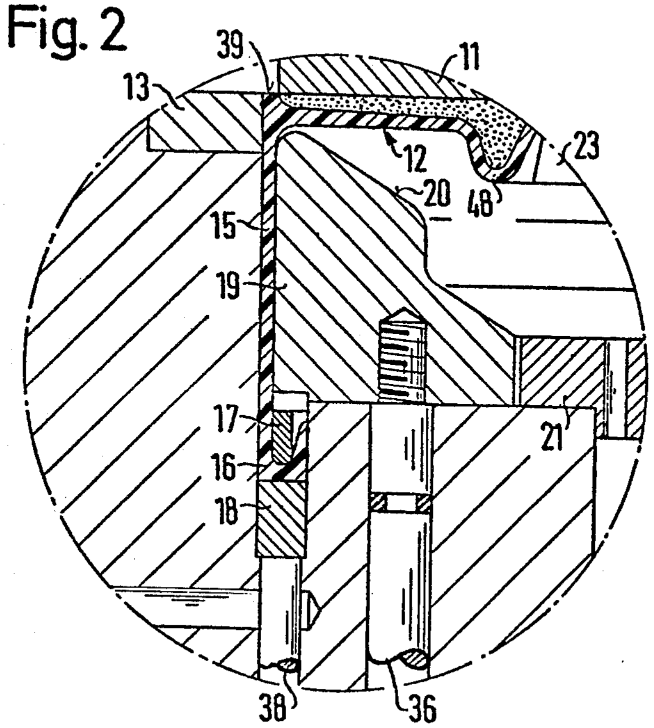
FIG. 2 is a partial section from FIG. 1, which shows the press in the filled position.

On a machine foundation 1 a column 2 is mounted, which at its head 3 carries a pivoting arm 4. The arm 4 has arranged on it on the one hand the filling funnel 5 and on the other hand a belt pulley 6. The belt pulley 6 can be caused to rotate via the belt 7 and the pulley 8 with the help of an electric motor 9. A rotating plate 11 provided with rails is attached to the belt pulley 6 by means of an intermediate disc 10. The material to be pressed discharged centrally through the funnel 5 is leveled on the membrane 12 by this plate 11. The membrane 12, which in the initial position has a generally flat shape, is limited at its edge by a gripping ring 13 and is held in the block 14. At the end of a cylindrical part 15 of the membrane there is located a reversed lip seal 16, which with the help of a gripping ring 17 and a counter-gripping ring 18 is held in position. Within the cylindrical part 15 of the membrane 12 there is mounted an annular support body 19, whose upper side 20 is constructed so as to correspond to the lower side of the plate. Within a ring 21 mounted on the block 14 is a sleeve 22. The sleeve 22 is mounted for movement and has a support plate 23 at its upper end. The upper end of the sleeve 22 has a central boss 24 which rests against a spring 25. As a result the whole arrangement consisting of the sleeve 22 and the boss 24, the support plate 23 can be pressed by the spring 25 in an upward direction towards the central part 26 of the membrane 12. However, the support plate does not exert any substantial pressure from below against the membrane. Instead its upward movement is so limited by the collar 27 on the lower end of the sleeve 22 that in its maximum upward position it supports but does not distort upwardly the central part 26 of the membrane 12. Even when the membrane is pressed downwards, it does not exert any substantial force opposing this movement of the membrane and instead it is suitably yielding in construction.

By means of the connection 28, a pressure medium, for example hydraulic oil, is introduced into the space 30, from which it passes via the channels 31 into the space 32 within the membrane 12. Suitable means are provided, such as a surge tank or the like, to enable the pressure medium to exert the desired pressure support to the membrane when the membrane is deflected as a result of the closing of the upper and lower moulds. The block 14 is supported on the foundation 1 by means of an intermediate ring 33. With the help of the cross arm 34 and the tension anchors 35 and 36 mounted for movement on the ends of this cross arm and which are anchored to the support body 19, and also by means of the spindle 37 which is journalled on the underside of the block 14, the support body 19 can be clamped to the block 14.

For replacement of the membrane 12 the counter-clamping ring 18 is raised with the help of lifting rods 38 after the support body 19 is unclamped from the block 14. As a result, the support body, the membrane and the clamping ring 17 can be lifted out in an upward direction, because the upper edge 39 of the membrane 12 extends beyond the upper end face 40 of the block 14 and the membrane can therefore be gripped without any difficulty.

Above the device described, which forms the lower mould of the press, is the upper tup 41. The upper tup 41 can be moved vertically in the direction of the double arrow 42. Its movement is coordinated with that of the pivoted arm 4, its downward movement being possible only when the arm 4 has been pivoted sideways to provide clearance. At its lower end the upper punch 44 is resiliently mounted by means of the springs 43. The lower end face of the upper punch 44 is precisely aligned with the inner side of the plate to be pressed. At 45 a part of the anti-overloading device is shown, which is preferably provided in the case of such a press.

Figure 3:
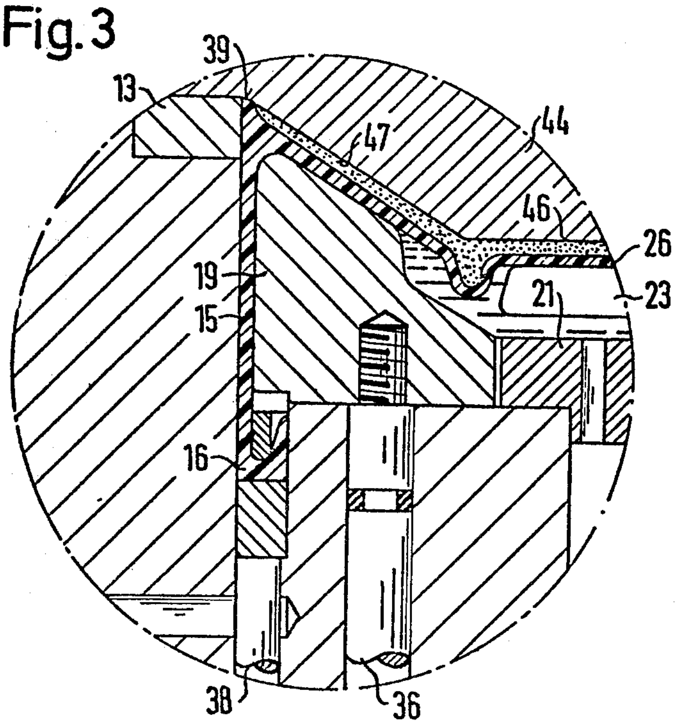
FIG. 3 shows the same partial section as in FIG. 2 but in the pressing position.

On downward movement of the upper tup with the upper punch, the lower flat part 46 of the upper punch 44 firstly engages the part of the flat, filled-in pulverulent porcelain composition, which lies above the center part 26 of the membrane. In the center part 26 of the membrane the support plate 23 presses upwardly resiliently resisting the downward movement of the upper punch. The upper punch overcomes this resistance and forces the membrane and the support plate 23 downwardly. Before the membrane 12 is forced to assume a configuration such that the angle of repose of the pulverulent composition is attained, the material is effectively trapped between the upper mould and the membrane. Thus, the material is positively held against inward, downward migration and proper, uniform density of the final product is assured. The closing of the device is that the upper punch gradually comes to bear against the edge part of the membrane and finally achieves the terminal position indicated in FIG. 3, in which the plate is pressed into its finished shape. During the entire pressing operation the membrane is supported substantially by the fluid pressing medium in the space 32. The foot shaped by the annular groove 48 is accurately formed by the pressure exerted by the liquid pressing medium, acting because not only does it control the downward movement of the groove with the membrane, it also presses laterally against the sides of the groove. Thus, the pulverulent porcelain composition in the groove is subjected to lateral compression, assuring accurate shaping and density. At the end of the pressing operation the pressure of the liquid pressing medium underneath the membrane is discontinued and as a result the annular groove becomes detached from the foot of the pressed plate and the membrane relaxes owing to its inherent elasticity returning to its flat condition. As it does so, it lifts the finished, pressed plate upwards where it can be freely removed.

The embodiments of the invention in which an exclusive property or privilege is claimed are defined as follows.

1. A press for the pressing of articles such as plates with a rigid upper pressing punch shaped in accordance with the inner side of the article to be produced and with a space beneath the upper pressing punch which space is closed by an elastic membrane held in place by a filling web said membrane shaped on its edge in accordance with the peripheral shape and dimensions of the article to be produced, characterized in that the membrane is provided with an annular groove corresponding to the foot of the plate and has a height of filling amounting approximately to twice the foot height of the article to be produced and wherein the space closed by the membrane is filled with a pressure medium, and means for pressurizing the space closed by said membrane and filled with said pressure medium after the pressing punch is lowered to the pressing position and onto the pulverulent porcelain composition spread on the membrane within the limits given by the filling web.

2. A press in accordance with claim 1, characterized in that said space closed by said elastic membrane includes a wall having the dimensions and the shape of the lower side of the article and said wall is a terminal abutment for the membrane sinking under the pressure of the pressing punch.

3. A press in accordance with claim 2, characterized in that a biased support plate is arranged in the pressure medium space concentric with the annular groove on the membrane, said support plate being positioned to hold the area of the membrane flat within said groove.

4. A press for forming articles such as plates from the pulverulent porcelain composition, said press comprising: upper and lower mould members, said mould member having a lower face shaped to form the inner face of an article; said lower mould having a fluid filled central chamber closed at its upper face by a peripherally anchored, distendable elastic membrane; said membrane having an upwardly opening depending pocket therein spaced from the periphery thereof for forming the foot of the article; a resiliently depressible support engaging the central portion of said membrane from beneath, the fluid in said chamber engaging that portion of said membrane surrounding said support and means for controlling the force said fluid exerts against said membrane; the side walls of said chamber surrounding said support being so shaped as to shape said membrane as it is distended to that of the sides of the finished article; means for forcing said upper mould into said chamber against the resistance of said support and fluid supported membrane to form between the membrane and the upper mould under controlled pressure an article blank from pulverulent porcelain material.

5. The press described in claim 4 wherein said pocket in said membrane is also spaced from said support and the bottom wall of said membrane at said pocket extends downwardly in a manner corresponding to the shape of said pocket whereby that portion of the membrane forming the side walls of said pocket is subjected to the pressure of the fluid in said chamber acting laterally of said pocket.

6. The press described in claim 4 wherein said support is biased toward said membrane both by the pressure exerted thereon by said fluid and by a spring.

7. The press described in claim 5 wherein said pocket is circular and concentric with said support.

8. A press for forming articles such as plates from a pulverulent porcelain composition, said press comprising: upper and lower mould members, said mould member having a lower face shaped to form the inner face of an article; said lower mould having a central chamber closed at its upper face by a distendable elastic membrane; said membrane being firmly secured about its periphery at the sides of said chamber and having an upwardly opening depending pocket therein spaced from the periphery thereof for forming the foot of the article; a support engaging the central portion of said membrane from beneath, the periphery of said support spaced from the walls of said chamber and means resiliently biasing said support upwardly; a fluid in said chamber engaging that portion of said membrane surrounding said support and means for controlling the force said fluid exerts against said membrane; the side walls of said chamber surrounding said support being downwardly tapered to shape said membrane to an inwardly dished shape corresponding to that of the sides of the finished article; means for distributing pulverulent porcelain composition on the top of said membrane; means for forcing said upper mould into said chamber against the resistance of said support and fluid supported membrane to form an article blank from the pulverulent material between the membrane and the upper mould under controlled pressure.

9. An improved press for the pressing of articles having a foot such as plates from a pulverulent composition of the type including a rigid upper pressing punch shaped in accordance with the upper side of the article to be produced and a lower mould, said lower mould comprising:

- a block defining a generally cylindrical cavity;
- a support body mounted within said cavity of said block and having an upper side shaped so as to correspond to the lower side of the article to be produced;
- a resilient membrane onto which the pulverulent composition is spread secured to said block and positioned over said support body, said membrane and said support body upper side defining a space, said membrane including an annular groove opening towards said upper pressing punch;
- a pressurizable fluid filling said space; and
- pressurizing means connected to said space for pressurizing said space after said upper pressing punch is lowered into contact with said porcelain composition.

10. An improved press as defined by claim 9 further including a membrane support means movably and resiliently mounted within said space for supporting the underside of said membrane within the area defined by said annular groove so that said area of said membrane is held flat during the pressing operation.

11. An improved press as defined by claim 10 wherein said membrane support means comprises:

- a ring mounted on said block and defining a central aperture;
- a sleeve slidably mounted with said central aperture;
- a support plate mounted on said sleeve; and
- spring means disposed between said support plate and said block within said sleeve for biasing said support plate against the underside of said membrane, said spring means not exerting a substantial force on said membrane during the pressing operation.

12. An improved press as defined by claim 9 further including:

- a threaded spindle rotatably mounted to the underside of said block at one end;
- an anchoring cross screwed on the other end of said spindle;
- a plurality of tension anchors mounted one at each end of said anchoring arm, said tension anchors extending from said arm and secured to said support body, whereby upon rotation of said spindle in one direction, said tension anchors clamp said support body to said block and upon rotation in the other direction said support body is moved out of said cylindrical cavity of said block.

13. An improved press as defined by claim 11 further including:

- a threaded spindle rotatably mounted to the underside of said block at one end;
- an anchoring cross screwed on the other end of said spindle;
- a plurality of tension anchors mounted one at each end of said anchoring arm, said tension anchors extending from said arm and secured to said support body, whereby upon rotation of said spindle in one direction, said tension anchors clamp said support body to said block and upon rotation in the other direction said support body is moved out of said cylindrical cavity of said block.

14. An improved press as defined by claim 12 wherein said membrane includes a cylindrical extension disposed between said block and said supporting body, said cylindrical extension terminating in a reverse lip seal, said reverse lip seal positioned concentric with the below said supporting body and wherein said mould further includes clamping means for clamping the cylindrical extension of said membrane to said block.

15. An improved press as defined by claim 14 wherein said clamping means comprises a cylindrical clamping ring sandwiching said extension against said block cavity and a counterclamping ring positioned below and engaging said lip seal.

16. An improved press as defined by claim 15 further including a plurality of lifting rods extending through said block and engaging said counterclamping ring for raising said counterclamping ring after said support body has been removed for easy replacement of said membrane.

17. An improved press as defined by claim 16 further including:

a filling funnel movable between said upper press and said lower mould for placing the pulverulent composition on the membrane;

a plate-shaped distributor concentric with and surrounding the discharge end of said funnel; and driving means for rotating said distributor so that the composition is distributed evenly on said membrane prior to pressing.

* * * * *

UNITED STATES PATENT AND TRADEMARK OFFICE

CERTIFICATE OF CORRECTION

PATENT NO. : 4,043,724

DATED : August 23, 1977

INVENTOR(S) : Rolf Egon Romnald Schubart

It is certified that error appears in the above-identified patent and that said Letters Patent are hereby corrected as shown below:

Column 6, line 62:

"the" should be --and--

Signed and Sealed this

*Seventh* Day of *February 1978*

[SEAL]

*Attest:*

RUTH C. MASON
*Attesting Officer*

LUTRELLE F. PARKER
*Acting Commissioner of Patents and Trademarks*